Patented July 17, 1934

1,966,797

UNITED STATES PATENT OFFICE 1,966,797

PROCESS FOR THE PREPARATION OF KETONES

Philip H. Groggins and Ray H. Nagel, Washington, D. C., assignors to Henry A. Wallace as Secretary of Agriculture, of the United States of America No Drawing. Application August 31, 1933, Serial No. 687,639

5 Claims. (Cl. 260—131)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government of the United States or any of its officers or employees in the prosecution of work for the Government, without payment to us of any royalty thereon.

This invention relates to aryl and aralkyl ketones and a novel method of manufacturing these compounds. It is an object of our invention to provide a method whereby these products can be made technically available in an economical manner.

Heretofore the aryl and aralkyl ketones have been made according to the Friedel and Crafts reaction by condensing either acid chlorides or acid anhydrides with aromatic compounds. Such syntheses may be illustrated by the following two methods of preparing p-methylacetophenone.

I. Condensation of an acid chloride.

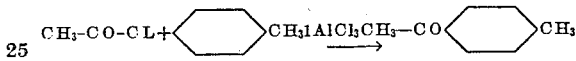

II. Condensation of an acid anhydride.

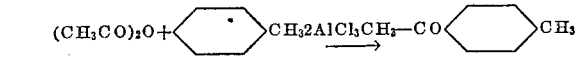

The principal drawback to these processes is the comparatively high cost of the acyl component. When acid anhydrides are employed, only one of the two acyl groups is found in organic combination after the reaction, but on the other hand acid chlorides are much more expensive and also disagreeable to handle.

We have made the surprising discovery that organic acids, can, under suitable conditions, be substituted for acid chlorides and anhydrides. Thus, in the preceding preparation of p-methylacetophenone we have found that ordinary glacial acetic acid can be used instead of the usual more expensive derivatives in carrying out the synthesis according to the Friedel and Crafts reaction. We have made a variety of such ketones, and have found that the reaction is of wide application.

By substituting ordinary commercial acetic acid for the more expensive acid chloride or anhydride a great saving in the cost of manufacture is effected. This substitution furthermore makes possible the application of the reaction on a wider scale than was heretofore possible.

It is apparent from the foregoing illustration that the savings are still greater in the substitution of the more costly acid derivatives, as for example the use of butyric or benzoic acids which we employ instead of the corresponding acid chlorides and anhydrides.

In carrying out our process we prefer to employ two or more molecular proportions of aluminum chloride (AlCl₃) per molecular proportion of organic acid being condensed. Under such conditions we have been able to obtain yields of about eighty (80) percent of the theoretical as pure ketones, the yield of crude ketone being almost the theoretical. In fact, in the preparation of acetophenone and p-methylacetophenone the yields obtained by the condensation of glacial acetic acid according to our invention are practically the same as those obtained by the use of acetyl chloride; the latter, however, costs about ten times as much as the former.

Although the exact course of the reaction cannot be definitely established, it is believed that the use of at least two moles of aluminum chloride per mole of acid promotes the formation of an acid chloride as an active intermediate product of reaction.

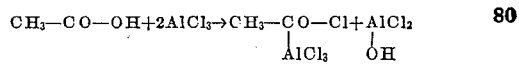

The labelized acid chloride then reacts in a normal manner according to the usual Friedel and Crafts reaction.

The following is an example of one mode of carrying out our invention, it being understood that this is merely an illustrative embodiment of the manner in which the process may be carried out. One mole of acetic acid is added slowly to an excess of toluene which contains 2.5 moles of anhydrous aluminum chloride in suspension. The mass is stirred and warmed to a temperature of 105° C. It is maintained at this temperature for a period of seven hours during which time the liberated hydrogen chloride is permitted to escape through a reflux condenser. Preferably a slightly reduced pressure is kept on the reaction vessel in order to draw a current of dry air over the reaction mass and thus facilitate the removal of the hydrogen chloride. The reaction mass is cooled, hydrolyzed with either cold dilute hydrochloride or sulfuric acid, and the aqueous portion comprising an acid solution of aluminum salts is removed by decantation. This portion is subsequently washed with toluene to remove all of the organic constituents.

The toluene solution of aralkyl ketone is thoroughly washed with water and then distilled with steam. The steam volatile toluene and p-methylacetophenone are collected and after separation from the accompanying water are distilled in vacuo. A practically pure product; b. p. 226 to 227 deg. C. and M. P. about 24 deg. C. is obtained in yields of about 80 percent of the theoretical.

It is obvious that the process may be modified as to temperature, ratio of aromatic component, use of extraneous inert solvents, the metal halide used, and in many other particulars, without departing from the scope of our invention.

Instead of acetic acid, other organic acids, such as butyric and benzoic acids, may be employed. Instead of toluene, other aromatic compounds, such as benzene, o-dichlorobenzene, naphthalene, diphenyl and chlorodiphenyl, may be used.

Having thus fully described our invention, we claim:

1. The process of preparing ketones, which comprises condensing one molecular proportion of an organic unsubstituted carboxylic acid with aromatic compounds devoid of hydroxyl groups in the presence of at least two molecular proportions of aluminum chloride.

2. The process of preparing aralkyl ketones, which comprises condensing one molecular proportion of an aliphatic unsubstituted carboxylic acid with an aromatic compound devoid of hydroxyl groups in the presence of at least two molecular proportions of aluminum chloride.

3. The process of preparing aryl ketones, which comprises condensing one molecular proportion of an aromatic unsubstituted carboxylic acid with an aromatic compound devoid of hydroxyl groups in the presence of at least two molecular proportions of aluminum chloride.

4. The process of making ketones, which comprises condensing one molecular proportion of an organic unsubstituted carboxylic acid with an aromatic compound devoid of hydroxyl groups, which is present in excess, by the use of at least two molecular proportions of an aluminum halide.

5. The process of preparing ketones, which comprises condensing one molecular proportion of an organic unsubstituted carboxylic acid with an aromatic compound devoid of hydroxyl groups dissolved in an inert solvent, in the presence of at least two molecular proportions of an aluminum halide.

PHILIP H. GROGGINS.
RAY H. NAGEL.